Jan. 22, 1952　　　H. F. PARKER　　　2,583,155
ANTISKID CHAIN
Filed July 9, 1947
Fig. 1.
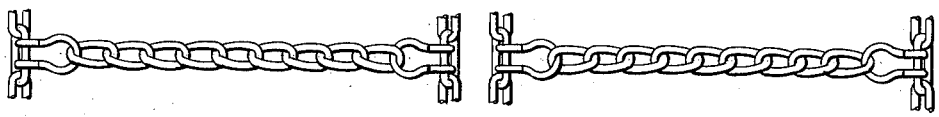
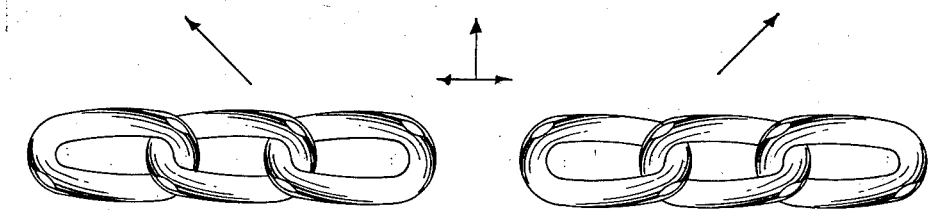
Fig. 2.
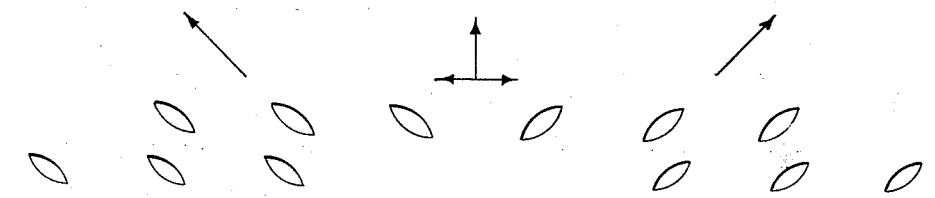
Fig. 3.
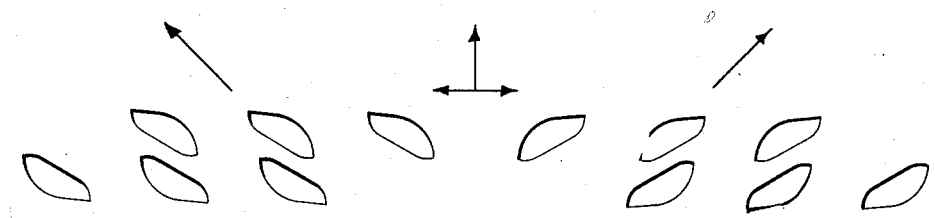
Fig. 4.
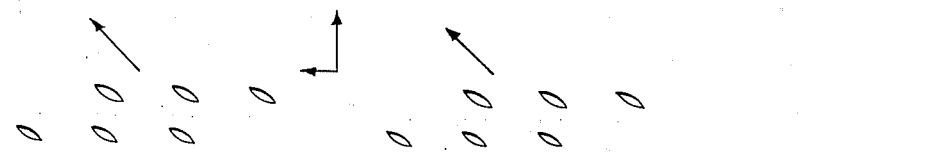
Fig. 5.
INVENTOR
Humphrey F. Parker
BY
Bean, Brooks, Buckley & Bean.
ATTORNEYS Patented Jan. 22, 1952

2,583,155

UNITED STATES PATENT OFFICE 2,583,155

ANTISKID CHAIN

Humphrey F. Parker, Buffalo, N. Y., assignor to Columbus McKinnon Chain Corporation, Tonawanda, N. Y.

Application July 9, 1947, Serial No. 759,780

3 Claims. (Cl. 152—239)

This invention relates to automotive vehicle tire chains of the type sometimes referred to as antiskid chains and the like.

The conventional type antiskid chain such as is currently used on automotive vehicles to obtain improved traction and reduction of skidding tendencies, for example during winter driving, comprises a plurality of cross chains secured either to side chains lying alongside the tire side walls or directly to the wheel. Such cross chains are sometimes of simple twisted link chain stock, or the links thereof are in some cases specially shaped and supplemented by special antiskid lugs welded or otherwise attached to the chain links so as to extend therefrom with a view to providing prongs or spikes intended to dig into the road-ice and snow. However, such specially twisted and shaped link chains are invariably relatively complicated and expensive to manufacture, and are undesirably bulky under the tire, thereby causing rough riding; and it is a primary object of the present invention to provide paired sets of antiskid chains comprising most economically manufactured type cross chain pieces fabricated into sets of chains adapted to equip opposite wheels of an automobile so as to provide improved side-skid protection in both directions as well as good traction in the direction of travel, in combination with relatively smooth riding characteristics.

Another object of the invention is to provide a set of antiskid chains of the character referred to which comprises individual wheel chains which may be interchangeably applied to oppositely paired wheels of an automobile to obtain side skid protection in either direction as well as improved starting and braking traction in the direction of automobile travel.

Another object of the invention is to provide the features and advantages aforesaid in an antiskid chain construction of the most inexpensive type.

Another object of the invention is to provide an improved tire chain for the purposes aforesaid; the cross chain links of the tire chain being so shaped as to normally contact the road surface and to wear in such manner as to obtain under all operating conditions optimum antiskid protection and maximum chain life.

Another object of the invention is to employ an inherent structural characteristic of a certain type inexpensive chain stock to produce by virtue of a unique arrangement of parts paired sets of chains for oppositely paired wheels of a vehicle such as may be interchangeably mounted upon the wheels while invariably providing side skid protection in both directions as well as improved starting and braking traction.

Other objects and advantages of the invention will appear in the specification hereinafter.

In the drawings:

Fig. 1 is a composite plan view of a set of tire chains of the invention, showing in the case of each chain only one of the cross chain elements thereof;

Fig. 2 is a composite fragmentary view of the cross chains of Fig. 1, showing the track patterns and the skid resistance characteristics thereof at an early stage of wear on the cross chain links;

Fig. 3 is a view showing the corresponding track patterns and skid resistance characteristics at an intermediate stage of wear on the cross chain links;

Fig. 4 is a view similar to Fig. 3 at a stage of wear corresponding approximately to the ultimate useful life of the tire chains; and Fig. 5 is a view similar to Figs. 3–4 but illustrating the track pattern and skid resistance characteristics of a typical prior skid-chain arrangement.

Prior arrangements of tire chains contemplating side-skid protection as well as starting-stopping traction have usually embodied either complicated and expensive twisting of the chain links or the addition of specially shaped spikes welded to or formed as integral extensions of the basic chain link formations. As distinguished from the prior art the present invention contemplates taking advantage of the inherent characteristics of a simple twisted link type chain to provide ground contact zones at diagonally opposite corner portions of each link; the contact areas being elongate in directions oblique to the length of the chain and therefore oblique in relation to the line of automobile travel when the chain is used as a cross chain for antiskid purposes. Such chains are relatively inexpensively manufactured by either fully or semi-automatic machinery employing simple processes involving the steps of joining bent links together by welding or the like to form simple straight link chains, and then twisting the straight links by relatively rotating the opposite ends of the chain in a suitable machine. Or, such twisted type chain may be manufactured by first forming straight chain links and then bending the latter by pressing between dies so as to bend them about axes extending diagonally of the long axis of the straight link. When such bent links are united in chain fashion a twisted type chain results.

In any case a chain is produced which when used as a cross chain for antiskid purposes contacts the road surface at two points on every link; said points being at diagonally opposite corners of the link where the twisted formation has raised the two "high spots" upon the link, as illustrated for example by Figs. 2–4. As shown in the drawing, the contact areas of each link expand increasingly in all directions as the wearing of the cross chain links progresses, but at all times the ground contacting portions of the links form substantially parallel track patterns extending in a direction obliquely laterally of the direction of automobile travel. Thus, whereas a straight link type chain when used as an antiskid cross chain presents its bar-like road contacting portions to extend lengthwise in directions purely crosswise of the road, and therefore give no element of side-skid protection, the obliquely directed road contacting portions of the twisted link chain provide side-skid protection in one direction as well as starting-stopping traction.

However, if all of the cross chains of a set of antiskid chains for oppositely paired wheels of an automobile are formed of chain stock embodying the same direction of twist, then all of the side-skid protection afforded by such a set of tire chains is against skidding in only one sidewise direction and the car is relatively free to skid in the direction of the oblique arrows as illustrated by Fig. 5. This is because whenever an automobile is being braked, for example, during the deceleration period any tendency of the car to side-skid is reflected in a combination of forwardly and laterally directed forces resulting in a single resultant motion directed obliquely of the intended direction of travel and in the direction of the lengths of the ground contacting portions of the twisted tire chain links. Likewise, when accelerating the forward speed of the car, the obliquely directed ground contacting portions of the chain links tend to skid the car toward the opposite side of the road.

In the case of the present invention the antiskid chains are manufactured in sets of paired chain members for application to paired wheels at opposite sides of the vehicle; the cross chains in the case of one member of the set being formed of straight link chain stock which has been twisted to the right as viewed axially of the chain length, while the cross chains of the other member of the set are formed of straight link chain stock which has been twisted to the left. Thus, each set of tire chains of the invention will comprise a pair of antiskid chain members each having its cross chain elements formed of straight links twisted uniformly in the same direction throughout the length of each cross chain, whereas all of the cross chain links of one member of the set are twisted in one direction while all of the cross chain links of the other member of the set are twisted in the opposite direction. Fig. 1 is a composite fragmentary view of a set of chains of the invention, showing the oppositely directed twist in the cross chains of the members of the set. Thus, as illustrated diagrammatically by Figs. 2–4, the arrangement of the present invention provides at all times perfect balancing of all side-skid forces while retaining maximum traction for acceleration and braking.

The invention provides an improvement over prior art arrangements such as is illustrated for example in U. S. Patent No. 2,238,883, wherein the cross chains comprise series of alternately oppositely twisted links. Such chains are invariably bulky under the tire, and are relatively expensive to manufacture, whereas the chains of the present invention are as inexpensive to manufacture as are the conventional chains illustrated by the track pattern of Fig. 5.

I claim:

1. A set of tire chains consisting of a pair of tire chains adapted to be mounted upon laterally oppositely paired wheels of a vehicle, said chains including cross chains disposed to extend substantially normal to the direction of wheel rotation and formed of twisted link chain stock, the cross chains of one of said tire chains being of simple flat looped type chain links all of simple flat looped type which are twisted in the same direction, and the cross chains of the other tire chain being of chain links all of which are twisted in the opposite direction.

2. A set of tire chains consisting of a pair of tire chains adapted to be mounted upon laterally oppositely paired wheels of a vehicle, said chains each comprising a pair of side chains interconnected at intervals by cross chains disposed to extend substantially normal to the direction of wheel rotation and formed of twisted link chain stock, the cross chains of one of said tire chains being of simple flat looped type chain links all of which are twisted in the same direction, and the cross chains of the other tire chain being of simple flat looped type chain links all of which are twisted in the opposite direction.

3. A set of tire chains consisting of a pair of tire chains adapted to be mounted upon laterally opposite paired wheels of a vehicle, said chains including cross chains disposed to extend substantially normal to the direction of wheel rotation and formed of simple flat looped twisted link chain stock, the cross chains of one of the tire chains being of right hand twisted chain stock, and the cross chains of the other tire chain being of left hand twisted chain stock.

HUMPHREY F. PARKER.

REFERENCES CITED

The following references are of record in the file of this patent:

UNITED STATES PATENTS

| Number | Name | Date |
|---|---|---|
| 913,674 | Shattuck | Feb. 23, 1909 |
| 1,423,202 | Fellows | July 18, 1922 |
| 1,575,535 | Brouillette | Mar. 2, 1926 |
| 2,198,478 | Hewel | Apr. 23, 1940 |

FOREIGN PATENTS

| Number | Country | Date |
|---|---|---|
| 1,802 | Great Britain | 1903 |
| 12,926 | Great Britain | 1909 |